United States Patent
Dixon

(10) Patent No.: US 6,212,787 B1
(45) Date of Patent: Apr. 10, 2001

(54) TAPE MEASURING DEVICE

(76) Inventor: Thomas J. Dixon, 1520 Sandy Point La., Blossvale, NY (US) 13308

( * ) Notice: Subject to any disclaimer, the term of this patent is extended or adjusted under 35 U.S.C. 154(b) by 0 days.

(21) Appl. No.: 09/241,144

(22) Filed: Feb. 1, 1999

Related U.S. Application Data

(60) Provisional application No. 60/073,508, filed on Feb. 3, 1998.

(51) Int. Cl.⁷ ................................................. G01B 3/02
(52) U.S. Cl. ............................... 33/759; 33/770; 33/668
(58) Field of Search ............................ 33/41.6, 42, 755, 33/758, 759, 760, 761, 768, 769, 770, 668

(56) References Cited

U.S. PATENT DOCUMENTS

| | | | |
|---|---|---|---|
| D. 256,340 | 8/1980 | Spohn, Jr. | D10/74 |
| D. 339,536 | 9/1993 | Ribron | D10/72 |
| D. 341,545 | 11/1993 | Killian | D10/72 |
| D. 342,459 | 12/1993 | Shen | D10/72 |
| D. 342,686 | 12/1993 | Rios | D10/61 |
| D. 345,513 | 3/1994 | Syrett | D10/65 |
| D. 350,703 | 9/1994 | Fifer | D10/72 |
| D. 365,366 | 12/1995 | Cerrato | D19/73 |
| D. 366,443 | 1/1996 | Bach et al. | D12/217 |
| 4,023,277 | 5/1977 | Fizer | 33/27 C |
| 4,744,150 * | 5/1988 | Horvath | 33/138 |
| 4,976,037 * | 12/1990 | Hines | 33/27.03 |
| 4,999,924 | 3/1991 | Shields | 33/770 |
| 5,040,256 * | 8/1991 | Mills | 7/164 |
| 5,172,486 | 12/1992 | Waldherr | 33/770 |
| 5,513,436 | 5/1996 | Cerrato | 30/459 |
| 5,515,617 * | 5/1996 | Canfield | 33/768 |
| 5,671,543 * | 9/1997 | Sears | 33/668 |
| 6,032,379 * | 3/2000 | Usami | 33/758 |
| 6,070,338 * | 11/2000 | Garity | 33/760 |
| 6,148,534 * | 11/2000 | Li | 33/769 |

* cited by examiner

Primary Examiner—G. Bradley Bennett
Assistant Examiner—G. Verbilsky
(74) Attorney, Agent, or Firm—Brian B. Shaw, Esq.; Stephen B. Salai, Esq.; Harter, Secrest & Emery LLP

(57) ABSTRACT

A tape measure includes a guide at the end of the free end of the measurement tape that seats a marking instrument in a perpendicular orientation with respect to the tape and disposes the center line of the marking instrument aligned with the end of the tape. The tape measure may include at least one sharpener incorporated in its housing. The guide, or other attachments for the end of a tape measure, may include measurement markings on its upper surface aligned with measurement markings on the tape to permit precise measurements to be taken at the very end of the tape.

13 Claims, 3 Drawing Sheets

TAPE MEASURING DEVICE

This application claims priority of U.S. provisional application Ser. No. 60/073,508, filed Feb. 3, 1998.

FIELD OF THE INVENTION

The present invention relates to measuring devices, more particularly, to a tape measure having a guide at the end of the tape and/or pencil sharpening devices incorporated into the housing of the tape measure.

BACKGROUND OF THE INVENTION

Conventional retractable tape measures, commonly used in the carpentry and construction industries as well as for general home repairs, include a tape with measurement markings and a housing for storing the tape. The far end of the tape is attached to retraction mechanism inside the housing, whereby the tape can be automatically retracted inside the housing for storage. Typically, such tape measures include a locking mechanism so the tape can be locked at various extended positions when in use. Also, conventional tape measures often include an attachment at the free end of the tape, including a downwardly depending tab that can be engaged with the edge of a work surface.

Sometimes it is desired to scribe or scroll a line, i.e., draw a line parallel to an edge of a workpiece such as wood, sheet rock or wallboard. This has involved several steps, such as measuring and making a number of spaced apart reference marks on the workpiece, then drawing a line along the reference marks by separate placement of a straight edge or laying and snapping of a chalk line. Alternately, one may align the housing of the tape measure with an edge of a workpiece with one hand, and hold a pencil or marker at the free end of the tape with the other hand, and then move the two ends of the tape to scroll a parallel line. However, it is difficult to hold the pencil or marker firmly in position at the end of the tape with conventional tape measures.

Additionally, many conventional tape measures are constructed such that the attachment at the free end of the tape including the downwardly depending tab partially obscures measurement markings at the end of the tape. Thus, for precise, smaller measurements (for example, measurements less than ½-inch), one cannot reliably use the end of the tape. Rather, one must either use a separate measuring instrument, such as a marked straight edge, or a different section of the measurement tape.

Finally, at a work site, it may become necessary to sharpen a pencil or other sharpenable marking instrument. This becomes awkward if one must interrupt the work to locate a sharpener. This becomes especially awkward if a sharpener sized to fit the marking instrument is not available.

This invention seeks to solve the aforementioned problems.

SUMMARY OF THE INVENTION

According to an embodiment of this invention, a guide is provided for engaging a free end of a measurement tape and seating a marking instrument thereto. The guide comprises: a downwardly depending flange extending substantially perpendicular to a longitudinal axis of the tape, the flange adapted for alignment with the end of the tape; and a recess in the depending flange and an upstanding seating flange for seating the marking instrument in a perpendicular orientation with respect to a longitudinal axis of the tape such that the center line of the marking instrument is substantially aligned with the end of the tape.

The recess and the seating flange are selected to dispose a center line of a marking instrument coextensive with the end of the tape. Preferably, the seating flange includes an elongated channel having a curved surface generally corresponding to the curvature of the recess According to various preferred embodiments, the guide comprises an attachment member for attachment to a surface of the tape at the end thereof, the depending flange extending downwardly and substantially perpendicular to an edge of the attachment member, the seating flange extending upward from the edge of the attachment member, and the recess formed in the edge of the longitudinal member.

According to another embodiment of the invention tape measure comprises: a housing; a tape with measurement markings thereon retractable to and from the housing; at least one pencil sharpener in the housing, the housing including a recess for accessing the pencil sharpener with a marking instrument; and a guide on a free end of the tape, wherein the guide includes a depending retaining tab, an upstanding seating flange and a recess, the seating flange and the recess selected to dispose a center line of a marking instrument coextensive with the end of the tape. The recess of the guide, the elongated channel of the seating flange, and the sharpener recess in the housing may all be sized to receive a marking instrument of a predetermined size.

According to another embodiment, a tape measure comprises: a tape with measurement markings on an upper surface thereof; and an attachment including a first surface abutting the upper surface of the tape at the end of the tape. a second surface opposed to the first surface, and a depending flange extending substantially perpendicular to a longitudinal axis of the tape at the end of the tape, wherein the second surface includes measurement markings. According to various preferred embodiments, the measurement markings on the second surface of the attachment are aligned with the measurement markings on the tape upper surface, and the attachment is a guide of this invention.

This invention also provides a tape measure comprising a housing, a tape with measurement markings thereon retractable to and from the housing via a port in the housing, and first and second pencil sharpeners, each pencil sharpener having a recess in the housing sized to receive a marking instrument, wherein the recess of the first pencil sharpener has a larger diameter than a recess of the second pencil sharpener.

DETAILED DESCRIPTION OF THE PREFERRED EMBODIMENT

Figure 1:
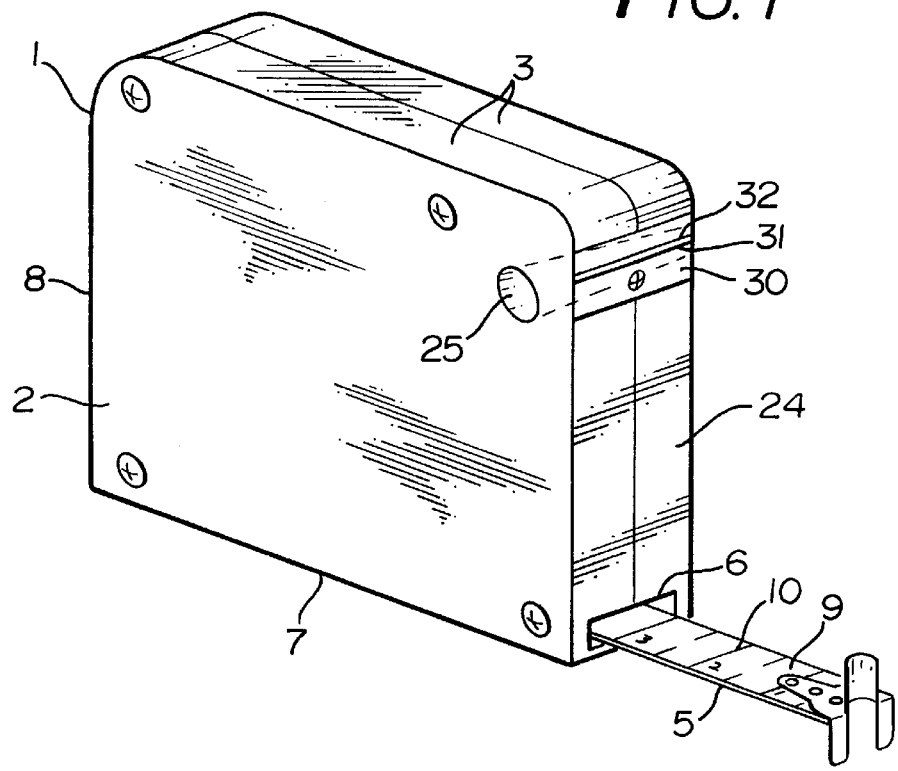
FIG. 1 is a schematic perspective view of a tape measure according to various preferred embodiments of the invention.

FIG. 1 illustrates a tape measure according to various preferred embodiments of the invention. Tape measure 1 includes housing 2. Housing 2 is generally box-like and may be constructed of any variety of materials, such as metal, plastic, a composite or laminate, in any manner generally known in the art. for example, housing 2 may be constructed of two shells 3 connected by fasteners 4. Housing 2 retains a length of measurement tape 5 that is stored in a coiled configuration within the housing and is retractable to and from housing 2 through port 6. In addition, the housing includes a retraction mechanism for selectively retracting the tape into the housing, for example, the far end of the tape may be connected to a conventional spring mechanism in the interior of the housing that automatically retracts the tape inside the housing. The tape measure may also include a conventional locking mechanism for disposing a length of the tape in an extended position and preventing the tape from automatically retracting inside the housing. Conventionally, such locking mechanisms may be activated by a user via some type of button located at the bottom surface 7 of the housing, or on the surface 8 opposed to port 6. The tape may be formed of any variety of materials such as metal, plastic, composites or laminates. The tape is generally flexible, yet self-supporting in a sufficiently limited distance of material. The tape may be planar or formed with curvilinear profile or cross-section. The upper surface 9 of tape 5 is marked with measurement markings 10 at predetermined increments, for example, in 1/8 or 1/16 inch increments, and the measurement markings may be printed on the tape.

Figure 2:
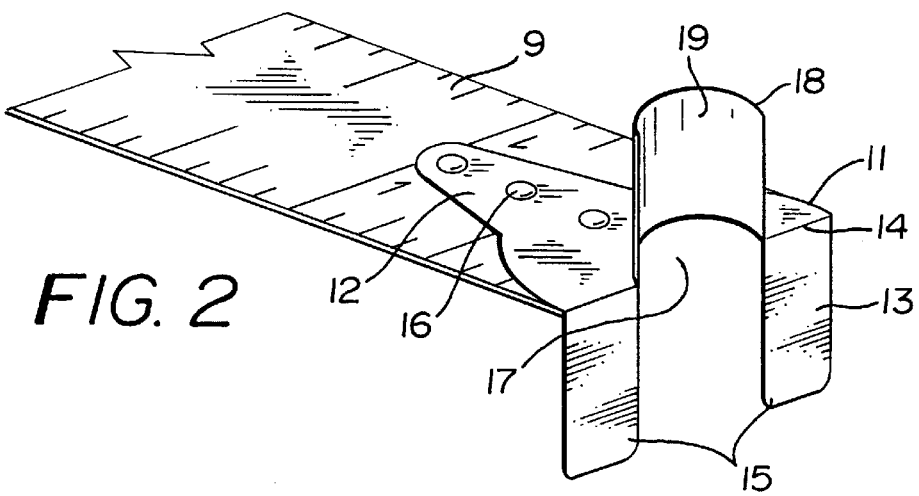
FIG. 2 is an enlarged perspective view of the guide in FIG. 1.
Figure 3:
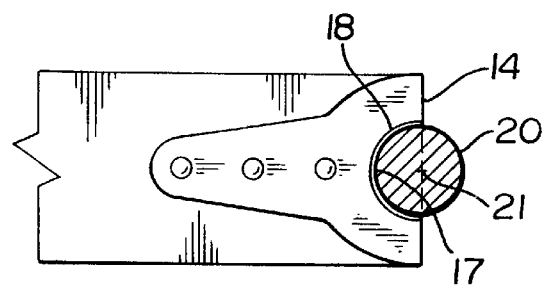
FIG. 3 is atop elevational view of the guide of FIG. 2, including a marking instrument seated in the guide.

Referring to FIGS. 1 to 3, the free end of tape 5 incorporates guide 11. Guide 11 may be integral with the end of the tape, or, as shown in the figures, guide 11 is attached to the tape through attachment member 12, extending coextensively along a longitudinal axis of the tape. The lower surface of attachment member 12 abuts upper surface 9 of the tape at the end of the tape. Guide 11 also includes a depending flange 13 extending downwardly from edge 14 and substantially perpendicular to a longitudinal axis of the tape. Accordingly, flange 13 is adapted for alignment with the end of the tape. For the illustrated embodiment, flange 13 is defined by two downwardly depending tabs 15 for engaging a lip or shoulder of a workpiece to releasably retain the free end of the tape, while a remainder of the portion of the tape is played out from the housing. Accordingly, flange 13 has sufficient rigidity that it can be placed over an edge of a workpiece, such as a board, a plywood sheet, or a section of sheetrock or plasterboard, to retain the end of the tape aligned with the edge of the workpiece while the tape is extended by a user holding the housing of the tape measure.

Attachment member 12 of the guide may be integral with tape 5, or attached to the tape with fasteners, such as rivets, or with an adhesive, bonding or welding. An advantage of using fasteners is that the corresponding holes 16 in member 12 can be slightly oversized with respect to the diameter of the fastener; this mismatch between the fastener diameter and hole diameter is predetermined to correspond essentially to the thickness of flange 13. Therefore, when flange 13 is pressed against a surface to make an inside measurement, guide 11 is moved slightly towards the housing; when flange 13 is placed over an edge of a workpiece and the tape extended, guide 11 is moved slightly away from the housing—in other words, there would be compensation for the thickness of the flange if precise inside measurements are desired. Attachment member 12 may have a cross-sectional shape generally corresponding to that of the tape. For example, when the tape is flat, attachment member 12 would be flat, i.e., edge 14 would be linear; when the tape has an arcuate cross-section, edge 14 would most likely be arcuate.

Guide 11 is adapted to receive and locate a marking instrument, such as a pencil, at the end of the tape. A cross-sectional view of marking instrument 20 is illustrated schematically in FIG. 3. For this purpose, guide 11 includes locating recess 17 in edge 14, with recess 17 sized such that upon locating a marking instrument within the recess, the center line 21 of the marking instrument aligns with the end of the tape. Preferably, recess is essentially shaped as semi-circular. Also, it is preferred that the radius of recess corresponds essentially to the radius of the marking instrument. For this reason, one preferred radius of curvature of this recess is 5/32-inch since many pencils and other marking instruments have a diameter of 5/16-inch. However, it is within the scope of the invention for the recess to have other dimensions, for example, in trades where tradesmen typically use other marking instruments, such as pencils having a diameter of 7/16-inch, recess 17 may be designed with a recess of 7/32-inch radius of curvature and marketed directly to that trade.

Preferably, guide 11 also includes upstanding seating flange 18 defining an elongated channel 19, which facilities seating the marking instrument in a perpendicular orientation with respect to the longitudinal axis of the tape. The channel has a cross-sectional profile sized to be a generally coincident configuration with the marking instrument to be employed. Thus, it is preferred that elongated channel of seating flange 18 has a curved surface generally corresponding to the curvature of recess 17. Preferably, the seating flange 18 has sufficient height (or length) such that the marking instrument is perpendicularly oriented with respect to the longitudinal axis of the tape. An operable height has been found to be approximately 3/4 inch. Thus, the marking instrument may be seated in the guide and maintain its perpendicular orientation with respect to the tape. That is, the marking instrument can be readily prevented from tilting or skewing relative to the tape or edge 14.

Accordingly, in a preferred embodiment, the integral, one-piece guide defines a generally Y-shaped profile, wherein the upper portions of the two legs of the Y define the depending tabs that are bent downwardly over the end of the tape. The crotch of the Y has the desired curvilinear recess. The seating flange is integrally formed with the Y and is folded or bent to extend upwardly and is formed in the desired curvilinear profile.

Therefore, the present invention may be used for scrolling or scribing, such as the making of a continuous line along a piece of material such as sheet rock or wall board. Specifically, the desired length of tape is withdrawn from the housing and preferably locked with respect to the housing. The user holds the housing in one hand and uses the edge of the sheet material as a guide for this hand. The free end of the tape is grasped with the second hand. The marking instrument is seated in the guide, and held against the guide, for example, the user's thumb may be placed along the side of the seating flange closest to the housing, with the forefinger placed against the instrument and the side of the seating flange furthest from the housing. Then, the user pulls (or pushes) their hands in a parallel orientation with the first hand using the edge of the sheet material as a guide. The guide traces a path parallel to the edge of the sheet material and thereby forms a continuous line on the sheet material, parallel to the edge of the sheet material. This process reduces the steps previously required to form such a line.

FIG. 1 also illustrates another feature of the invention. In addition to including the guide 11, the tape measure includes at least one sharpener 30 in housing 2. The pointed end of the marking instrument has access to the sharpener 30 via recess 25 in the housing. Especially in the case where the tape measure includes only a single sharpener, as in the illustrative embodiment of FIG. 1, recess 25 is adapted to receive a marking instrument sized to match recess 17 and seating flange 18 of the guide. The sharpener may be a conventional pencil sharpener, mounted in the housing, for example, in an aperture formed between portions of shells 3, by any variety of means such as a fastener or an adhesive. Cutting edge 31 and the adjacent slit 32 may be exposed to the exterior of housing for discharge of marker shavings. The recess 25 and the cutting edge 31 are aligned so that a point may be formed on the end of the marking instrument. If desired, sharpener 30 may be recessed sufficiently within surface 24 of the housing to prevent a user from cutting their finger or hand on the cutting edge while holding the tape measure.

Figure 4:
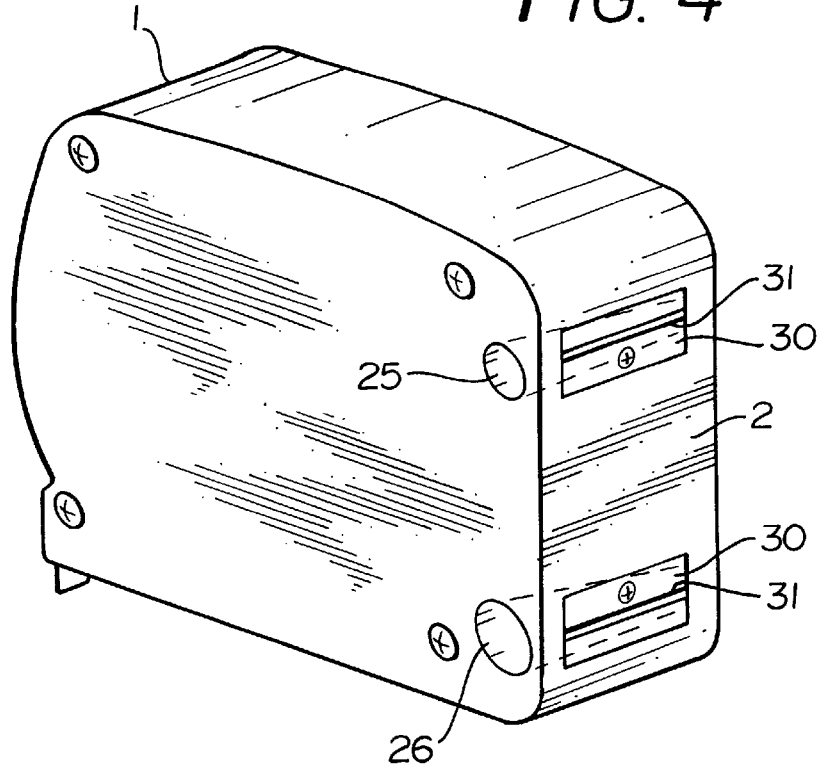
FIGS. 4 and 5 are schematic perspective views of a tape measure according to another embodiment of the invention where the tape measure includes two sharpeners.
Figure 5:
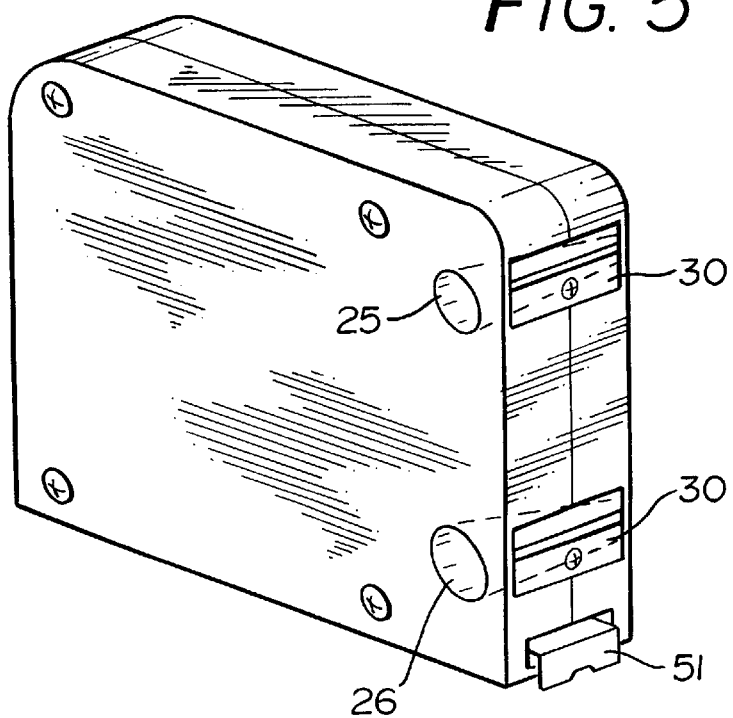

FIGS. 4 and 5 illustrate alternate, distinct embodiments of the invention, where a tape measure includes at least two sharpeners 30 in housing 2. Sharpeners 30 may have the same general construction as discussed with reference to FIG. 1. Each sharpener includes a respective recess 25,26 for receiving an end of the marking instrument, and a cutting edge 31 for selectively removing a portion of the marking instrument. Preferably, one of the recesses 26 is sized to receive a 7/16 inch diameter marking instrument in a lower corner of the housing and an upper corner of the housing includes recess 25 sized to receive a 5/16 inch diameter marking instrument.

Figure 6:
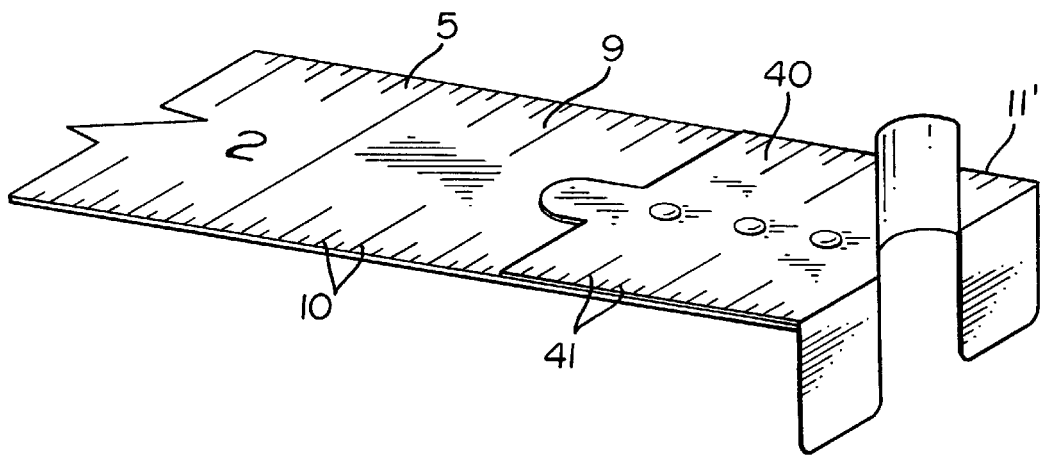
FIG. 6 is a schematic perspective view of an alternate guide of the invention with measurement markings.
Figure 7:
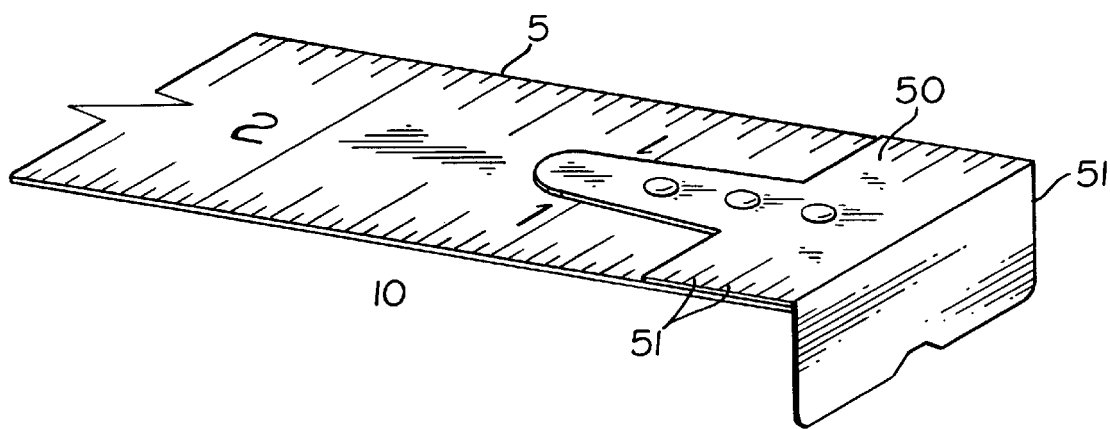
FIG. 7 is a schematic perspective view of a guide with measurement markings according to another embodiment.

FIGS. 6 and 7 illustrate further distinct embodiments of the invention. In FIG. 6, guide 11 is aligned with the free end of the tape, as in FIG. 1. Tape 5 includes measurement markings 10 on upper surface 9. Upper surface 40 of guide 11 includes measurement markings 41. These markings on the guide may be printed on surface 40, etched or scribed into the surface (for example, in the case where the guide is made of a material such as metal) or molded into the surface (for example, in the case where the guide is made of a molded material such as plastic). The markings 41 of the guide are aligned with the measurement markings of the tape, and preferably are in the same increments, for example, 1/8 inch or 1/16-inch increments. In FIG. 7, the attachment 50 at the end of the tape has a tab 51 similar to various conventional tape measures. Attachment 50 includes measurement markings 51 aligned with markings 10 on the tape. In some conventional tape measures, there is a downwardly depending tab at the end of the free end, attached to the end of the tape in a manner that it partially obscures measurement markings at the end of the tape, or at least makes it difficult to read these markings with accuracy. In contract, these embodiments of the invention permit precise, smaller measurements, (for example, measurements less than ½-inch) using the end of the tape, rather than having to use a separate measuring instrument, such as a marked straight edge, or a different section of the measurement tape, for such measurements. It is preferred that the marked surface 40 of the guide 11, or the marked surface of attachment 50, extends at least ½ inch from the end of the tape.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed:

1. A guide for engaging a free end of a measurement tape and seating a marking instrument thereto, comprising:
   a downwardly descending flange extending substantially perpendicular to a longitudinal axis of the tape, the flange adapted for alignment with the end of the tape; and
   a recess in the descending flange and an upstanding seating flange for seating the marking instrument in a perpendicular orientation with respect to a longitudinal axis of the tape such that the center line of the marking instrument is substantially aligned with the end of the tape.

2. The guide of claim 1, further comprising an attachment member for attachment to a surface of the tape at the end thereof, the descending flange extending downwardly and substantially perpendicular to an edge of the attachment member, the seating flange extending upward from the edge of the attachment member, and the recess formed in the edge of the attachment member.

3. The guide of claim 2, wherein the attachment member is planar.

4. The guide of claim 2, wherein the seating flange includes an elongated channel, the channel having a curved surface generally corresponding to the curvature of the recess.

5. A tape measure comprising:
   a housing;
   a tape with measurement markings thereon retractable to and from the housing;
   at least one pencil sharpener in the housing, the housing including a recess for accessing the pencil sharpener with a marking instrument; and
   a guide on a free end of the tape, wherein the guide includes a depending retaining tab, an upstanding seating flange and a recess, the seating flange and the recess selected to dispose a center line of a marking instrument coextensive with the end of the tape.

6. The tape measure of claim 5, wherein the guide comprises an attachment member for attachment to a surface of the tape at the end thereof, a depending flange extending downwardly and substantially perpendicular to an edge of the attachment member, the depending flange defining the retaining tab, the seating flange extends upward from the edge of the attachment member, and the recess is formed in the edge of the attachment member.

7. The tape measure of claim 6, wherein the recess of the guide, the elongated channel of the seating flange, and the sharpener recess in the housing are all sized to receive a marking instrument of a predetermined size.

8. A tape measure comprising:
   a tape with measurement markings on an upper surface thereof; and
   an attachment including a first surface abutting the upper surface of the tape at the end of the tape, a second surface opposed to the first surface, an upwardly projecting seating flange extending substantially perpendicular to the a longitudinal axis of the tape at the end of the tape and a depending flange extending substantially perpendicular to the longitudinal axis of the tape at the end of the tape, wherein the second surface includes measurement markings and a recess formed in the edge of the attachment to dispose a center line of the marking instrument coextensive with the end of the tape.

9. The tape measure of claim 8, wherein the measurement markings on the second surface of the attachment are aligned with the measurement markings on the tape upper surface.

10. The tape measure of claim 8, wherein the second surface of the guide is marked with measurement markings in ¹⁄₁₆-inch increments.

11. The guide of claim 8, wherein the first and second surfaces are planar.

12. The guide of claim 8, wherein the first and second surfaces are arcuate in cross-section to correspond substantially to a curved tape.

13. A tape measure comprising a housing, a tape with measurement markings thereon retractable to and from the housing via a port in the housing, and first and second pencil sharpeners, each pencil sharpener having a recess in the housing sized to receive a marking instrument, wherein the recess of the first pencil sharpener has a larger diameter than a recess of the second pencil sharpener.

* * * * *